(12) United States Patent
Mochizuki et al.

(10) Patent No.: US 9,368,144 B2
(45) Date of Patent: Jun. 14, 2016

(54) OPTICAL INFORMATION RECORDING MEDIUM AND METHOD FOR MANUFACTURING SAME

(71) Applicant: FUJIFILM Corporation, Tokyo (JP)

(72) Inventors: Hidehiro Mochizuki, Odawara (JP); Toshio Sasaki, Odawara (JP); Tetsuya Watanabe, Haibara-gun (JP); Tatsuo Mikami, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/670,066

(22) Filed: Mar. 26, 2015

(65) Prior Publication Data

US 2015/0262607 A1 Sep. 17, 2015

Related U.S. Application Data

(63) Continuation of application No. PCT/JP2013/073524, filed on Sep. 2, 2013.

(30) Foreign Application Priority Data

Sep. 27, 2012 (JP) ................................. 2012-214933
Mar. 5, 2013 (JP) ................................. 2013-043447

(51) Int. Cl.
*G11B 7/24* (2013.01)
*G11B 7/24035* (2013.01)
(Continued)

(52) U.S. Cl.
CPC ............ *G11B 7/24035* (2013.01); *G11B 7/245* (2013.01); *G11B 7/246* (2013.01); *G11B 7/24038* (2013.01); *G11B 7/256* (2013.01); *G11B 7/26* (2013.01)

(58) Field of Classification Search
CPC ..... G11B 7/245; G11B 7/246; G11B 7/24035; G11B 7/24038
See application file for complete search history.

(56) References Cited

U.S. PATENT DOCUMENTS

| 4,719,615 A | 1/1988 | Feyrer et al. |
| 4,852,075 A | 7/1989 | Feyrer et al. |

(Continued)

FOREIGN PATENT DOCUMENTS

| JP | 2771231 B2 | 10/1990 |
| JP | 7-118090 B2 | 12/1995 |

(Continued)

OTHER PUBLICATIONS

Sean A. Passino et al., "Three-Pulse Echo Peak Shift Studies of Polar Solvation Dynamics", J. Phys. Chem., 1997, pp. 725-731, vol. 101, No. 4.

(Continued)

*Primary Examiner* — Elizabeth Mulvaney
(74) *Attorney, Agent, or Firm* — Sughrue Mion, PLLC

(57) ABSTRACT

The object of the invention is to provide an optical information recording medium which excels in stability e.g., for preserving the properties during a long-term storage and which enables recording using a laser having a small peak power, and a method for manufacturing such an optical information recording medium. An optical information recording medium 10 includes a recording layer 14, and intermediate layers (adhesive agent layer 15A and recording layer support layer 15B) adjacent to the recording layer 14, and the recording layer 14 includes a recording material comprising a one-photon absorption dye bound to a polymer binder (polymer compound).

19 Claims, 5 Drawing Sheets

(51) Int. Cl.
*G11B 7/245* (2006.01)
*G11B 7/246* (2013.01)
*G11B 7/24038* (2013.01)
*G11B 7/256* (2006.01)
*G11B 7/26* (2006.01)

(56) References Cited

U.S. PATENT DOCUMENTS 4,912,696 A 3/1990 Feyrer et al.
5,215,800 A 6/1993 Daido et al.

2013/0229901 A1 9/2013 Mochizuki et al.

FOREIGN PATENT DOCUMENTS

JP 10-329419 A 12/1998
JP 2000-076729 A 3/2000
JP 2012-089195 A 5/2012

OTHER PUBLICATIONS

International Search Report for PCT/JP2013/073524 dated Nov. 26, 2013, 5 pages in Japanese and English.
Office Action dated Jan. 5, 2016, issued in corresponding Japanese Application No. 2014-538312.

OPTICAL INFORMATION RECORDING MEDIUM AND METHOD FOR MANUFACTURING SAME

CROSS-REFERENCE TO RELATED APPLICATION(S)

This application is a continuation application of International Application No. PCT/JP2013/073524 filed on Sep. 2, 2013, which claims priority to Japanese Patent Application No. 2012-214933 filed on Sep. 27, 2012 and Japanese Patent Application No. 2013-043447 filed on Mar. 5, 2013, the disclosures of which are incorporated herein by reference in their entirety.

TECHNICAL FIELD

The present invention relates to an optical information recording medium comprising at least one recording layer and at least one intermediate layer adjacent to the recording layer, and a method for manufacturing the same.

BACKGROUND ART

As an optical information recording medium comprising recording layers and intermediate layers, for example, Patent Literature 1 discloses a recording layer including a polymer binder and a dye dispersed in the polymer binder. The Patent Literature 1 also teaches an optical information recording medium comprising a large number of recording layers each of which preferably includes a multi-photon absorption dye in order to minimize influence on an adjacent recording layer at the time of recording and reading information.

CITATION LIST

Patent Literature

Patent Literature 1: Japanese laid-open patent application publication No. 2012-89195

SUMMARY OF THE INVENTION

The dye dispersed in the polymer binder in the recording layer may disadvantageously spread into the intermediate layer with the lapse of time. If the dye disperses into the intermediate layer, reflection of light would become unlikely to occur at the interface, for example, between the recording layer and the intermediate layer, so that the performance for recording and/or reading information may be degraded. Therefore, the optical information recording medium in which the dye is spread in the recording layers may suffer from a problem in stability e.g., for preserving the properties during a long-term storage.

Further, in the case where the recording layer contains a multi-photon absorption dye, an ultrashort pulsed-laser with a large peak power is required for recording information. This leads to a problem such as an increase in the cost of an optical recording apparatus. It is therefore desirable to provide an optical information recording medium in which a semiconductor laser having a small peak power used for a conventional optical recording is is used for recording.

In view of the above, it is an object of the present invention to provide an optical information recording medium which excels in long-term stability and in which information can be recorded using a laser having a small peak power, and a method for manufacturing such an optical information recording medium.

In order to achieve the aforementioned object, the present invention provides an optical information recording medium comprising at least one recording layer, and at least one intermediate layer adjacent to the recording layer, wherein the recording layer includes a recording material comprising a one-photon absorption dye bound to a polymer compound.

With this configuration, since the recording layer contains the recording material comprising dye bound to a polymer compound, it is possible to prevent the dye from dispersing into the intermediate layer. This can improve the long-term stability of the optical information recording medium. Further, since a one-photon absorption dye is used as the dye, information can be recorded using a laser having a small peak power.

The above-described optical information recording medium may further comprise a plurality of recording layers, and it is preferable that the intermediate layer is provided between two adjacent recording layers.

This configuration serves to achieve high-capacity recording of the optical information recording medium.

In the above-described optical information recording medium, each recording layer may have a first interface and a second interface between the recording layer and two intermediate layers sandwiching the recording layer, and after a recording layer is irradiated with a recording beam, the recording layer has a recording mark which consists of a protrusion sticking out into the intermediate layer and which is formed in at least one of the first interface and the second interface.

With this configuration, since information is recordable with a relatively small energy, high sensitivity recording of the information is performed.

In the above-described optical information recording medium, it is preferable that content in mass percentage of the one-photon absorption dye in the recording material is less than 50%.

With this configuration, a sufficient height of the protrusion can be formed with reference to the interface before undergoing a change in shape.

In the above-described optical information recording medium, it is preferable that a thickness of the recording layer is equal to or greater than 50 nm.

With this configuration, since the thickness of the recording layer is sufficiently thick, the protrusion can be easily formed.

In the above-described optical information recording medium, it is preferable that the intermediate layer forming the interface in which the protrusion is formed is softer than the recording layer. If this is explained in terms of glass transition temperatures of the recording layer and the intermediate layer, it is preferable that a glass transition temperature of the intermediate layer forming the interface in which the protrusion is formed is lower than a glass transition temperature of the recording layer. Further, if this is explained by the specific configuration, it is preferable that the intermediate layer forming the interface in which the protrusion is formed is an adhesive agent layer.

With this configuration, when the recording layer deforms, e.g., thermally expands, by the irradiation with the recording beam, the intermediate layer is easily deformable by the pressure caused by the thermal expansion. Accordingly, the protrusion is more likely to remain in the interface. To compare the hardnesses of the recording layer and the intermediate layer, the materials used for forming the recording layer and the intermediate layer are made into bulk bodies, which are then pressed to each other. To be more specific, is when the bulk bodies are pressed to each other, it can be checked that the softer one will be recessed more deeply than the harder one.

The above-described optical information recording medium may be configured such that the protrusion is formed in one of the first interface and the second interface by irradiation with the recording beam, and the protrusion is not formed in the other one of the second interface and the first interface. In this instance, it is preferable that a difference between refractive indices of the intermediate layer and the recording layer is greater at the interface in which the protrusions is formed than at the interface in which the protrusion is not formed.

With this configuration, the interface in which the protrusion is formed is used for reading the information; for this purpose, it is preferable that the difference between refractive indices of the materials is large at both sides of this interface so that the interface reflectivity becomes relatively large and thus reading of the information can be performed easily. In contrast, the interface in which the protrusion is not formed is not used for reading the information; for this reason, it is preferable that the transmittance for a light beam used for recording or reading information (hereinafter referred to as a "recording/reading beam") (i.e., the total transmittance of the first interface and the second interface) can be increased. Accordingly, in the case of multi-layered recording layers, the light beam can reach far deeper recording layers from the recording/reading beam radiation side. This is advantageous for increasing the storage capacity by increasing the number of recording layers.

In the above-described configuration, it is preferable that the refractive index of the intermediate layer at the interface in which the protrusion is not formed is equal to the refractive index of the recording layer.

With this configuration, since the light reflectivity of this interface is substantially zero, in the case of multi-layered recording layers, the light beam can reach far deeper recording is layers from the recording/reading beam radiation side. This is advantageous for increasing the storage capacity by increasing the number of recording layers.

In the above-described optical information recording medium, the protrusion may stick out in the range of 1-300 nm with reference to the interface before undergoing a change in shape.

In the above-described optical information recording medium, a thickness of the intermediate layer may be in the range of 2-20 µm.

With this configuration, the number of recording layers can be increased while restricting a crosstalk across recording layers.

The above-described optical information recording medium may further comprise a cover layer for protecting the recording layer.

This configuration can serve to prevent the recording layer from being damaged or soiled.

Further, it is preferable that a thickness of the cover layer is in the range of 0.01-0.2 mm.

If the cover layer is too thin, damage or soil of the cover layer may be detected during recording and reading information. On the other hand, if the cover layer is too thick, aberration may occur in the optical system of an optical recording apparatus. However, the above configuration can restrict these disadvantages.

The above-described optical information recording medium may further comprise a guide layer for performing a tracking servo. In this configuration, it is preferable that the optical information recording medium comprises a spacer layer for adjusting the distance between the recording layer and the guide layer.

This configuration can reduce the likelihood that light reflected by the guide layer affects the recording layer nearest to the guide layer.

Further, it is preferable that the thickness of the spacer layer is in the range of 5-100 µm.

The above-described optical information recording medium may further comprise a hard coat layer provided on a light-incident surface.

This configuration can serve to prevent the light-incident surface of the optical information recording medium from being damaged or soiled.

The above-described optical information recording medium may be stored in a cartridge.

This configuration can serve to prevent the optical information recording medium from being damaged as well as to improve the light fastness of the optical information recording medium.

Further, in order to achieve the aforementioned object, the present invention provides a method for manufacturing an optical information recording medium comprising a recording layer and an intermediate layer adjacent to the recording layer, the method comprising: a first step of preparing a coating liquid by dissolving a recording material comprising a one-photon absorption dye bound to a polymer compound in a solvent; a second step of applying the coating liquid on a recording layer-forming surface; and a third step of carrying out a heat treatment for removing the solvent.

This method makes it possible to manufacture an optical information recording medium which enables recording using a laser having a small peak power, while improving the long-term stability. Further, since the material of the recording layer contains the recording material comprising the dye bound to the polymer compound, phase separation resulting from dispersion or aggregation of the dye is less likely to occur as compared to the case where a material comprising a dye dispersed in a polymer compound is used as the recording material; therefore, the solvent can be removed by the heat treatment. This makes it possible to remove the solvent in a short period of time, so that the productivity of the optical information recording medium can be improved.

The first step may comprise adjusting a concentration of the one-photon absorption dye contained in the recording material by adding the polymer compound.

According to this method, even if the recording layer is thickened, e.g., by appropriately diluting the concentration of the one-photon absorption dye contained in the recording material with the polymer compound, it is possible to reduce the absorptance to the recording/reading beam. Therefore, on one hand, the thickness of the recording layer is thickened to some extent so that the protrusion is easily formed as information, but on the other hand, the absorptance of one recording layer can be reduced to increase the number of recording layers.

In the third step, the heat treatment may be carried out at a temperature higher than a glass transition temperature of the recording layer.

According to this method, since the solvent can be removed in shorter period of time, the productivity of the optical information recording medium can be further improved.

DESCRIPTION OF EMBODIMENTS

One embodiment of the present invention will be described with reference to the drawings.

Figure 1:
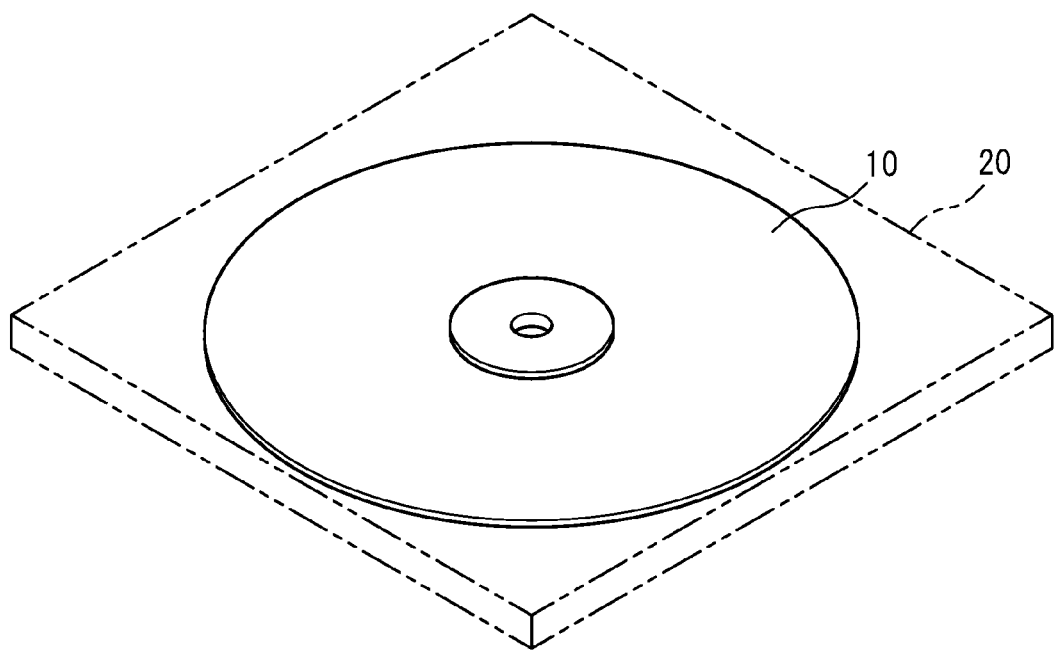
FIG. 1 is a diagram illustrating an optical information recording medium according to one embodiment.

As seen in FIG. 1, an optical information recording medium 10 according to one embodiment of the present invention takes a circular plate shape, and in order to prevent the optical information recording medium 10 from being damaged or soiled due to fall or handling as well as to improve the light fastness, the optical information recording medium 10 is stored in a cartridge 20.

Figure 2:
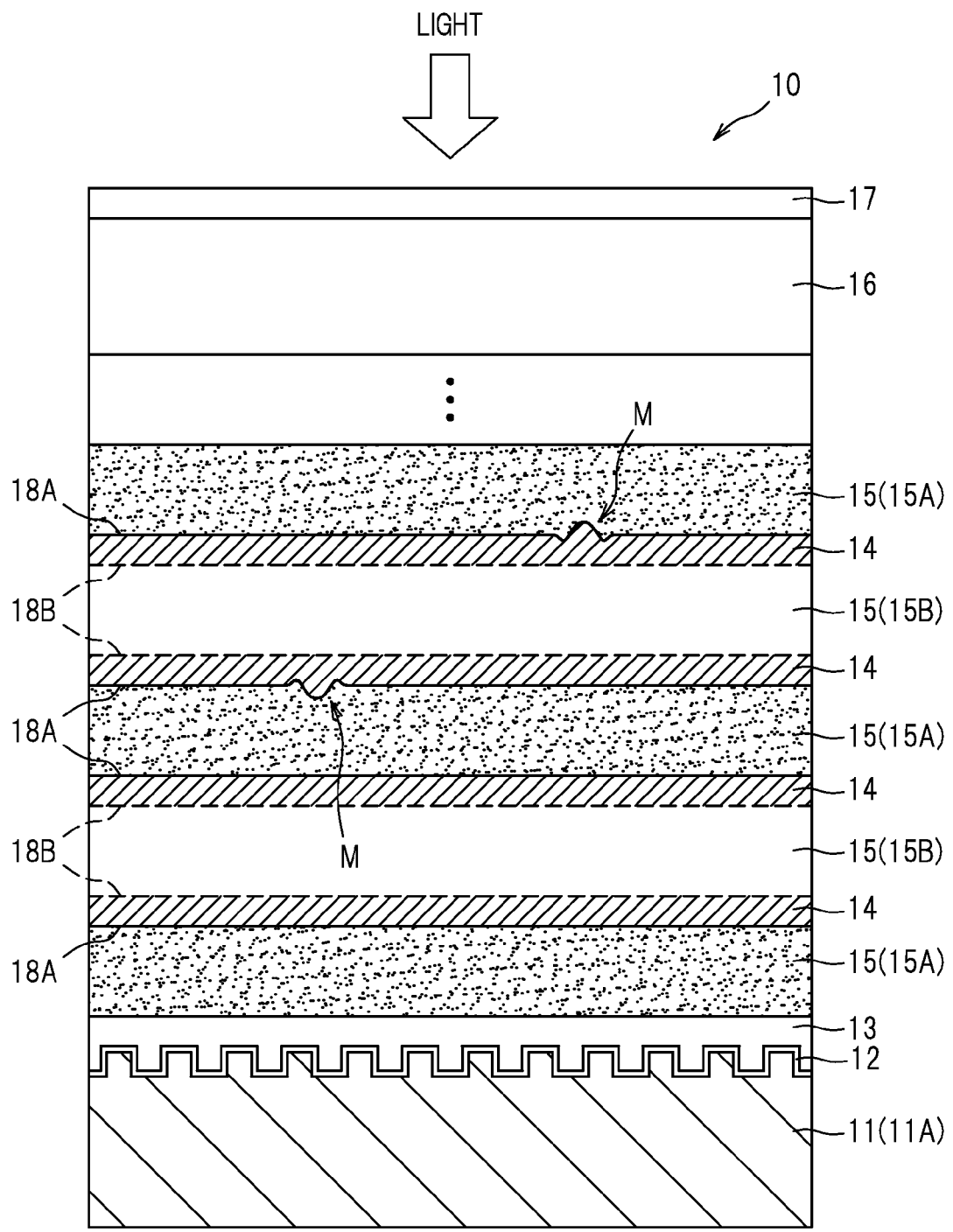
FIG. 2 is a sectional view of the optical information recording medium.

As seen in FIG. 2, the optical information recording medium 10 includes a substrate 11, a reflective layer 12, a spacer layer 13, a plurality of recording layers 14, a plurality of intermediate layers (adhesive agent layers 15A and recording layer support layers 15B), a cover layer 16, and a hard coat layer 17. In this embodiment, an interface formed between a recording layer 14 and an adhesive agent layer 15A is referred to as a reflective interface 18A as an example of a first interface, and an interface formed between a recording layer 14 and a recording layer support layer 15B is referred to as a non-reflective interface 18B as an example of a second interface.

The substrate 11 is a support member for supporting the recording layers 14, the intermediate layers 15, and other layers. As an example, the substrate 11 is a circular plate made of polycarbonate. In the present invention, the material of the substrate 11 is not specifically limited. It is preferable that the substrate 11 has a thickness in the range of 0.02-2 mm. Further, the substrate 11 according to this embodiment has asperities (servo signal) which functions as a guide for tracking servo on the surface where a recording/reading is beam is incident (upper-side surface in the drawing), and therefore the substrate 11 also functions as a guide layer 11A. The guide layer 11A may be a layer where the servo signal has been recorded, for example, by utilizing a change in the refractive index. Further, the guide layer 11A may be provided as a layer different from the substrate 11.

The reflective layer 12 is a layer for reflecting the servo beam and consists of an aluminum thin film evaporated onto the uneven surface of the substrate 11 (guide layer 11A). Providing the reflective layer 12 makes it possible to detect the servo signal at the incident side of the servo beam, and therefore the structure of the reading apparatus can be simplified.

The spacer layer 13 is a layer for adjusting the distance between the recording layer 14 and the guide layer 11A and made of a material such as thermoplastic resin, thermosetting resin, ultraviolet curable resin, and adhesive. Preferably, the spacer layer 13 has a thickness in the range of 5-100 μm. Providing the spacer layer 13 makes it possible to reduce the likelihood that light reflected by the guide layer 11A affects the recording layer 14 nearest to the guide layer 11A.

The recording layer 14 is a layer made of a light-sensitive material on which information is optically recorded; the recording layer 14 includes a recording material which comprises a polymer binder as an example of a polymer compound and a one-photon absorption dye covalently bonded to the polymer binder and absorbent of a recording beam.

The one-photon absorption dye for absorbing the recording beam may include, for example, dyes which have been conventionally used as a thermally deformable heat mode type recording material. Specific examples of the dyes may include methine dyes (cyanine dyes, hemicyanine dyes, styryl dyes, oxonol dyes, merocyanine dyes, etc.), large ring dyes (phthalocyanine dyes, naphthalocyanine dyes, porphyrin dyes, etc.), azo dyes (including azo-metal chelate dyes), arylidene dyes, complex dyes, coumarin dyes, azole derivatives, triazine derivatives, benzotriazole derivatives, benzophenone derivatives, phenoxazine derivatives, phenothiazine derivatives, 1-aminobutadiene derivatives, cinnamic acid derivatives, quinophthalone dyes, etc.

The polymer binder to which the one-photon absorption dye is bound may include, for example, polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), polyvinyl alcohol (PVA), poly(vinyl benzoate), poly(vinyl pivalate), poly(ethyl acrylate), poly(butyl acrylate), cycloolefin polymer, etc.

The recording material comprising a one-photon absorption dye bound to a polymer binder may include, for example, a compound of the following chemical structural formula C-1. The compound of the chemical structural formula C-1 includes polybenzylmethacrylate as the polymer binder and a benzotriazole compound as the one-photon absorption dye, the benzotriazole compound being covalently bonded to polybenzylmethacrylate.

[Chem. 1]

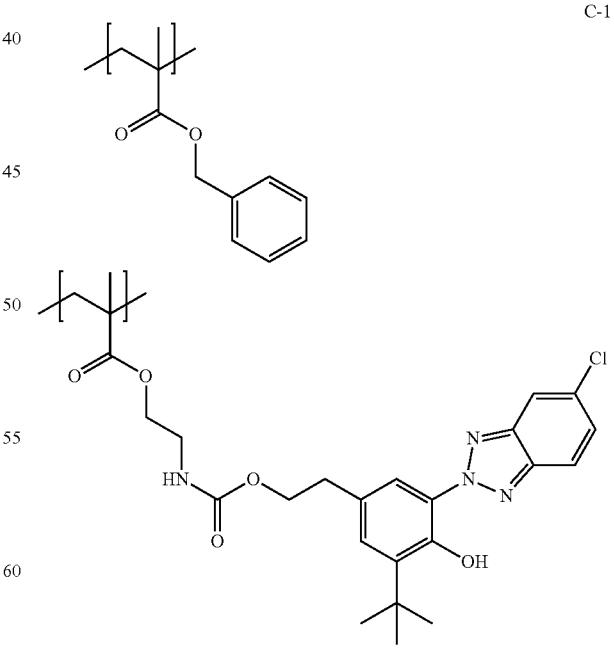

C-1

The recording layer 14 is a layer for recording dotted recording marks M (information) and configured such that when it is irradiated with a recording beam, the one-photon absorption dye absorbs the recording beam and generates heat, and the generated heat causes the polymer binder to undergo a change in shape to thereby cause the reflective interface 18A to stick out into the intermediate layer 15 (adhesive agent layer 15A) to form protrusions. According to the present invention, a recording mark M may include a center portion having a protrusion sticking out from the recording layer 14 into the adhesive agent layer 15A, and the protrusion may be surrounded by a recess which is recessed from the adhesive agent layer 15A into the recording layer 14 (a recessed shape recessed from a position of the reflective interface 18A before undergoing a change in shape).

For this reason, each recording layer 14 is thicker than the conventional recording layer containing a polymer binder and a dye, and the thickness of one recording layer 14 is preferably not less than 50 nm. If the thickness is less than 50 nm, the interface between the recording layer and the intermediate layer (corresponding to the reflective interface 18A or the non-reflective interface 18B in this embodiment) deforms such that a recessed shape is formed with reference to the recording layer before undergoing a change in shape. On the contrary, if the thickness is not less than 50 nm, the interface deforms such that a protrusion is formed at a center of the recorded spot. Although the thickness of the recording layer 14 does not have a determinate upper limit, it is preferable that the thickness thereof is not more than 5 μm in order to increase the number of recording layers 14 as many as possible. To be more specific, the thickness of the recording layer 14 is more preferably in the range of 100 nm to 3 μm, and further preferably in the range of 200 nm to 2 μm. As an example, the thickness of the recording layer 14 is 1 μm in this embodiment.

A plurality of recording layers 14 are provided, and the number of recording layers 14 provided is, for example, approximately in the range of 2-100 layers. To increase the storage capacity of the optical information recording medium 10, a large number of recording layers 14, for example, 10 or more recording layers 14 are preferable. This can achieve high-capacity recording of the optical information recording medium 10. Further, the recording layer 14 is made of a material of which the refractive index does not substantially change before and after recording performed by changing the shape of the reflective interface 18A.

It is preferable that the recording layer 14 has an absorptance (of one-photon absorption dye) to the recording beam not more than 10% per one layer. Further, in order to increase the number of recording layers 14, it is preferable that the absorptance of each recording layer is as small as possible as long as recording can be performed. Therefore, it is preferable that the absorptance of the recording layer 14 is not more than 8%, more preferably not more than 5%, and further preferably not more than 3%. This is because, for example, if the intensity of the recording beam which reaches the farthermost recording layer 14 has to be equal to or more than 50% of the intensity of the radiated recording beam, it is necessary that the absorptance per one recording layer is equal to or less than 8% in order to obtain eight recording layers, and that the absorptance per one recording layer is equal to or less than 3% in order to obtain twenty recording layers. If the absorptance is higher, the number of recording layers should be smaller; this lessens the effect of increasing the recording capacity by increasing the number of recording layers.

The recording layer 14 preferably comprises the one-photon absorption dye of less than 50 mass % of the recording material. In other words, it is preferable that the content in mass percentage of the polymer binder is equal to or more than 50 mass % (i.e., the polymer binder is the main component). By this recording material, a sufficient height (amount of protrusion) of the protrusion (recording mark M) can be formed with reference to the reflective interface 18A before undergoing a change in shape. When the recording layer 14 is is irradiated with the recording beam, the polymer binder undergoes a thermal expansion by absorption of the recording beam, thereafter the irradiation of the recording beam is stopped and the acquired expanded shape is maintained by quenching, to thereby form a protrusion. Therefore, if the content in mass percentage of the one-photon absorption dye is equal to or more than 50 mass % (i.e., the content in mass percentage of the polymer binder is less than 50 mass %), for example, the material of the polymer binder (which undergoes a thermal expansion by absorption of the recording beam) outflows and spills outside the expanded portion, with the result that formation of a protrusion is less likely to occur.

The intermediate layers 15 are provided between the recording layers 14, in other words, each intermediate layer 15 is provided adjacently above and below the recording layer 14 as shown in the drawing. To be more specific, the intermediate layer 15 includes an adhesive agent layer 15A and a recording layer support layer 15B, which are alternately arranged between the recording layers 14. In other words, one recording layer 14 is sandwiched between the adhesive agent layer 15A and the recording layer support layer 15B; in this embodiment, the adhesive agent layer 15A, the recording layer 14, the recording layer support layer 15B, and the recording layer 14 are repeatedly arranged in this order as viewed from the substrate 11 side.

In order to prevent crosstalk across a plurality of recording layers 14, the intermediate layer 15 is provided to from a predetermined amount of space between the adjacent recording layers 14. For this purpose, it is preferable that the thickness of the intermediate layer 15 is not less than 2 μm, and more preferably not less than 5 μm. Further, as long as the crosstalk can be prevented, it is preferable that the thickness of the intermediate layer 15 is as small as possible, such as 20 μm or less. In this embodiment, the thickness of the intermediate layer 15 (i.e., adhesive agent layer 15A and recording layer support layer 15B) is 10 μm each as an example. Since the thickness of the adhesive agent layer 15A and the thickness of the is recording layer support layer 15B are the same, namely 10 μm, the reflective interfaces 18A have non-constant pitches of 10 μm, 12 μm, 10 μm, 12 μm . . . . This can reduce the likelihood that the interference between a readout beam (i.e., the reflected beam at the reflective interface 18A to be generated upon reading information) and a reflected beam of a reading beam (i.e., the reflected beam of the reading beam generated at a reflective interface 18A that is adjacent to the reflective interface 18A used for reading the information) affects the readout beam.

The intermediate layers 15 are made of materials which are unreactive to irradiation with a laser beam at the time of recording and reading out the information. Further, in order to minimize the loss of the recording beam, the reading beam, and the readout beam (light including a readout signal generated by irradiation with the reading beam), it is preferable that each of the intermediate layers 15 is made of a material which does not substantially absorb the recording beam, the reading beam, and the readout beam, in other words, a material which is transparent to the recording beam, the reading beam, and the readout beam. Herein, the term "transparent" indicates that the absorptance is not more than 1%.

The adhesive agent layer 15A has adhesiveness to enable attachment to another surface and is softer than the recording layer 14. For example, the glass transition temperature of the adhesive agent layer 15A is lower than that of the recording layer 14. Accordingly, providing the adhesive agent layer 15A which is softer than the recording layer 14, as an intermediate layer 15 adjacent to one side of the recording layer 14 makes it possible to easily deform the intermediate layer 15 when the recording layer 14 is heated and expanded by the irradiation with the recording beam, with the result that a deformation is easily caused in the reflective interface 18A.

The recording layer support layer 15B is made of a material such as ultraviolet curable resin and has hardness equal to or greater than that of the recording layer 14. For example, is the recording layer support layer 15B has a glass transition temperature equal to or higher than that of the recording layer 14. Accordingly, providing the recording layer support layer 15B which is harder than the recording layer 14 as an intermediate layer 15 adjacent to the other side of the recording layer 14 makes it possible to cause the optical information recording medium 10 to deform such that when the recording layer 14 is irradiated with the recording beam, no protrusion is formed in the non-reflective interface 18B which is an interface between the recording layer 14 and the recording layer support layer 15B but a protrusion (recording mark M) is formed in the reflective interface 18A which is an interface between the recording layer 14 and the above-described adhesive agent layer 15A.

The adhesive agent layer 15A and the recording layer support layer 15B have different refractive indices, but the recording layer support layer 15B and the recording layer 14 have the same refractive index. Herein, "having the same refractive index" indicates that refractive indices are substantially the same. To be more specific, the recording layer 14 and the recording layer support layer 15B have comparative refractive indices such that $((n3-n1)/(n3+n1))^2 \leq 0.0003$ is satisfied, where n1 represents the refractive index of the recording layer 14, and n3 represents the refractive index of the recording layer support layer 15B, that is, the reflectivity at the non-reflective interface 18B is not more than 0.0003.

To prevent reflection at the interface between the recording layer 14 and the recording layer support layer 15B, it is preferable that the refractive indices of the recording layer 14 and the recording layer support layer 15B are as close as possible and that the difference between the refractive indices of the recording layer 14 and the recording layer support layer 15B is preferably not more than 0.05, more preferably not more than 0.03, further preferably not more than 0.01, and most preferably 0. As an example, if the refractive index n1 of the recording layer 14 is 1.565 and the refractive index n3 of the recording layer support layer 15B is 1.564, $((n3-n1)/(n3+n1))^2$ is almost 0.

On the contrary, the refractive indices of the adhesive agent layer 15A and the recording layer 14 are different from each other to some appropriate degree. Accordingly, the refractive index rapidly changes at the interface (reflective interface 18A) between the recording layer 14 and the adhesive agent layer 15A, so that the reading beam can be reflected. To be more specific, it is preferable that the difference between the refractive indices of the adhesive agent layer 15A and the recording layer 14 is greater than the difference between the refractive indices of the recording layer support layer 15B and the recording layer 14 and is not more than 0.11. To be more specific, the refractive indices of the recording layer 14 and the adhesive agent layer 15A are different from each other to some appropriate degree such that the following relation is satisfied:

$$0.0005 < ((n2-n1)/(n2+n1))^2 \leq 0.04$$

where n2 represents the refractive index of the adhesive agent layer 15A, that is, the reflectivity at the reflective interface 18A is not less than 0.0005 and not more than 0.04.

If the reflectivity is not less than 0.0005, the quantity of the reflected beam at the reflective interface 18A is large, so that a high signal-to-noise ratio is obtained at the time of reading the information. Further, if the reflectivity is not more than 0.004, the quantity of the reflected beam at the reflective interface 18A is restricted to an appropriately small degree, so that the recording/reading beam can reach far deeper recording layers 14 without considerable attenuation upon recording and reading out the information. This makes it possible to achieve high storage capacity of the optical information recording medium 10 by providing a large number of recording layers 14. As an example, if the refractive index n1 of the recording layer 14 is 1.565 and the refractive index n2 of the adhesive agent layer 15A is 1.477, $((n2-n1)/(n2+n1))^2$ is approximately 0.0008.

As described above, the refractive indices of the recording layer 14 and the intermediate layer 15 can be adjusted to enhance the total transmittance of the reflective is interface 18A and the non-reflective interface 18B; therefore, in the case of multi-layered recording layers, the light beam can reach far deeper recording layers 14 from the recording/reading beam radiation side. This is advantageous for increasing the storage capacity by increasing the number of recording layers. Especially in this embodiment, since the refractive index of the recording layer support layer 15B and the refractive index of the recording layer 14 are substantially the same, the light reflectivity at the non-reflective interface 18B is substantially zero, so that the light beam can reach far deeper recording layers 14. This is advantageous for increasing the storage capacity by increasing the number of recording layers.

In order to adjust the refractive indices of the recording layer 14 and the intermediate layer 15, the composition of the material for the recording layer 14 and the composition of the material for the intermediate layer 15 can be adjusted. To be more specific, since the material for the recording layer 14 contains a recording material comprising a one-photon absorption dye bound to a polymer binder, the polymer binder or the dye may be selectively adjusted to have an appropriate refractive index and to vary the composition ratio, whereby the refractive index of the recording layer 14 can be adjusted as desired. The refractive index of the polymer binder varies depending on the degree of polymerization even if they have similar basic components. For this reason, the refractive index of the recording layer 14 can also be adjusted using polymer binders with different degrees of polymerization or by adjusting the degree of polymerization of the polymer binder. Further, the refractive index of the recording layer 14 can be adjusted by mixing a plurality of polymer binders. Further, a refractive index matching material (inorganic particulate and the like) may be added to adjust the refractive index of the recording layer 14.

To adjust the refractive index of the intermediate layer 15, the degree of polymerization of the polymer material such as resin usable as the material for the intermediate layer 15 may be adjusted. Further, to adjust the refractive index of the intermediate layer 15, a material usable for the intermediate layer 15 may be added as desired or a refractive index matching material (inorganic particulate and the like) may be added.

The cover layer 16 is a layer for protecting the recording layers 14 and the intermediate layers 15, and is made of a material which allows the recording beam, the reading beam, and the readout beam to pass through the cover layer 16. As an example, the cover layer 16 may be formed by applying and curing ultraviolet curable resin or by attaching a film via adhesive or the like. Providing the cover layer 16 can prevent the recording layers 14 and the intermediate layers 15 from being damaged or soiled. It is preferable that the thickness of the cover layer 16 is in the range of 0.01-0.2 mm. If the cover layer 16 is too thin, damage or soil of the cover layer 16 may be detected during recording and reading the information. On the other hand, if the cover layer 16 is too thick, aberration may occur in the optical system of an optical recording apparatus. However, the above configuration can restrict these disadvantages.

The hard coat layer 17 is a layer provided on the light-incident surface (upper surface in the drawing) of the optical information recording medium 10, and is made of a material such as urethane resin, acrylic resin, urethane acrylate resin, and epoxy resin. Providing the hard coat layer 17 can prevent the light-incident surface of the optical information recording medium 10 from being damaged or soiled. According to the present invention, the hard coat layer may also serve as the above-described cover layer.

To provide identification information for individual optical information recording media, the optical information recording medium 10 may be partly marked with a bar cord or the like. This marking may be carried out by a thermal destruction method used for a conventional optical disc, such as disclosed in Japan Patent Nos. 3143454 and 3385285, in which the reflective layer 12 is irradiated with a laser beam for thermal destruction, and by is any other method such as irradiation of the recording layer 14 with a laser beam, or printing.

Next, description will be given of a method of recording/reading information on/from the optical information recording medium 10 configured as described above.

Figure 3:
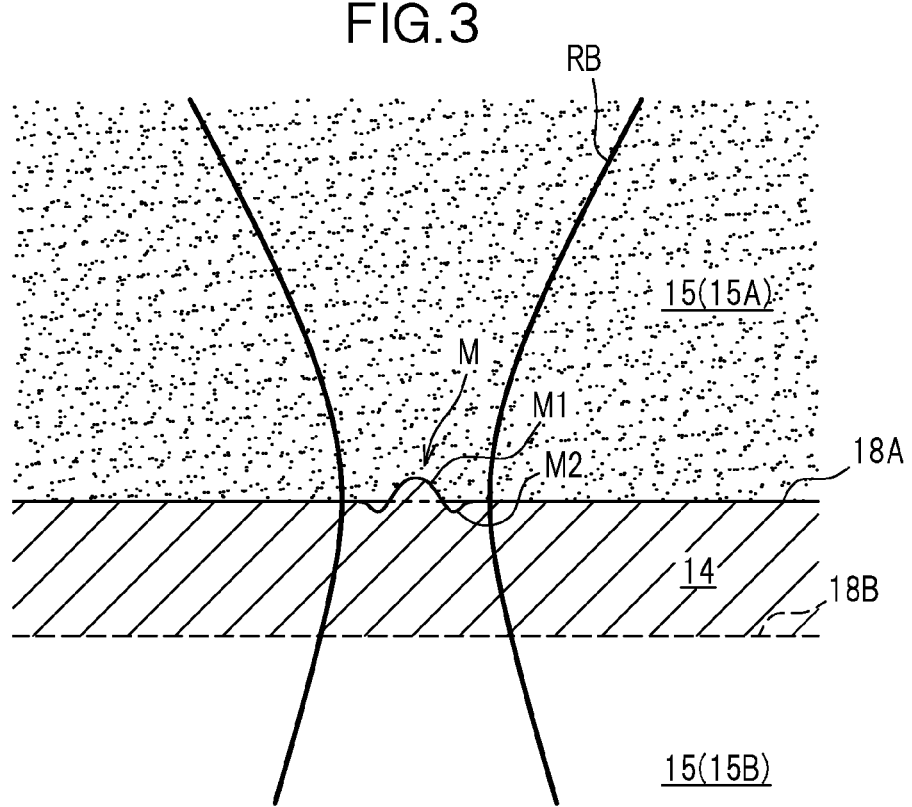
FIG. 3 is a diagram illustrating a recording mark formed at the time of recording information.

To record information in a desired recording layer 14, as seen in FIG. 3, the recording layer 14 is irradiated with a laser beam (recording beam RB) output of which is modulated in accordance with the information to be recorded. In this embodiment, since the dye contained in the recording layer 14 is a one-photon absorption dye, a semiconductor laser used for the conventional optical recording and having a small peak power can be adequately used to produce a laser beam. Although a focal position of the recording beam RB is not limited to a specific position, it is preferable that the recording beam RB is focused on or around the reflective interface 18A. To be more specific, it is preferable that the focal position is adjusted on the reflective interface 18A and thereafter slightly shifted toward the recording layer 14.

When irradiating the recording layer 14 with the recording beam RB, the recording beam-irradiated area changes its shape such that the center portion thereof has a shape protruding from the recording layer 14 into the adhesive agent layer 15A (intermediate layer 15), to thereby form a recording mark M (pit). More specifically, the recording mark M shown in FIG. 3 includes a protrusion M1 at the center portion, and a ring-shaped recess portion M2 surrounding the protrusion M1 and recessed into the recording layer 14. The distance of the recess portion M2 from the reflective interface 18A (the reflective interface 18A before undergoing a change in shape) to the deepest portion of the recess portion M2 is smaller than the distance of the protrusion M1 from the reflective interface 18A (the reflective interface 18A before undergoing a change in shape) to the peak of the protrusion M1. In other words, it can be said that the recording mark M as a whole has a generally protruding shape. Depending on the recording conditions, the optical information recording medium 10 is may only include protrusions M1 without formation of any recess portions M2 surrounding the protrusions.

As described above, since information can be recorded in the optical information recording medium 10 as protrusions sticking out from the recording layer 14 into the adhesive agent layer 15A, it is not necessary to require such a high energy that can result in decomposing or changing in phase of the recording layer, nor does it require such a large absorptance of the recording layer as is required in the conventional recording for the formation of recess portions; therefore, the information can be recorded with a relatively small energy. Accordingly, information can be recorded at high sensitivity, and as the required absorptance to the recording beam per recording layer 14 is smaller, the number of recording layers 14 can be increased.

Figure 4:
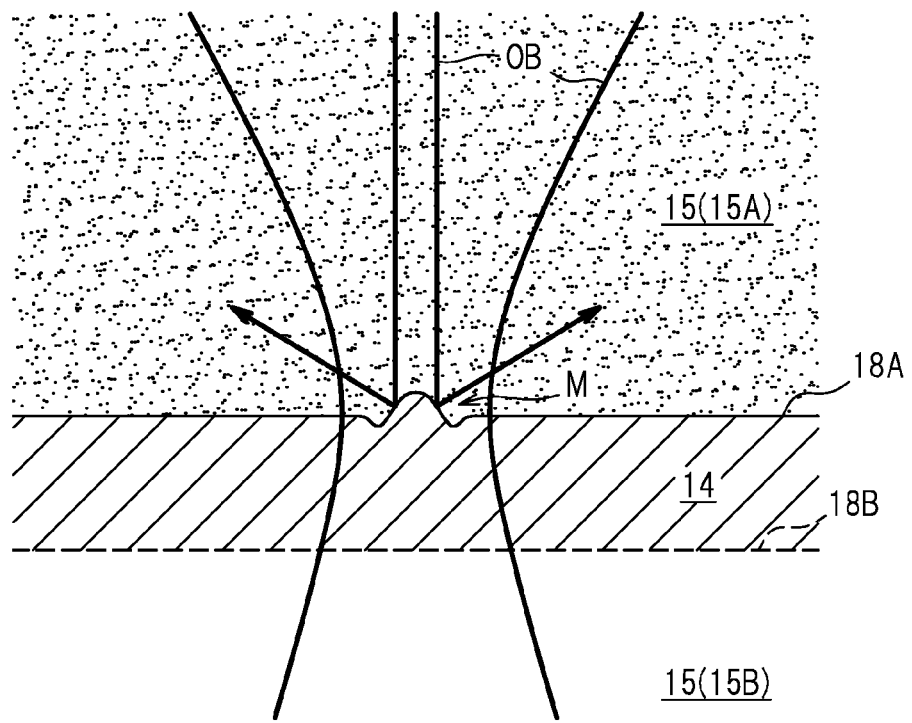
FIG. 4 is a diagram explaining reading of the information.

As seen in FIG. 4, when the recording mark M is irradiated with the reading beam OB using a continuous wave laser, the reading beam OB is reflected at the reflective interface 18A because of the difference between the refractive index of the recording layer 14 and the refractive index of the adhesive agent layer 15A. At this time, a difference in the light intensity will appear between the reflected beam at the reflective interface 18A surrounding the recording mark M and the reflected beam at the recording mark M, so that the recording mark M can be detected based on the difference of the reflectivity. It is noted that since the refractive index of the recording layer 14 does not change as a result of recording information, a reflection of the reading beam OB occurs only at the reflective interface 18A but not inside the recording layer 14, which leads to stable detection of the recording mark M. For the purpose of this optical detection, it is preferable that the protrusion M1 sticks out approximately in the range of 1-300 nm with reference to the interface (reflective interface 18A) before undergoing a change in shape.

In this embodiment, since the recording mark M includes the recess portion M2 surrounding the protrusion M1, it is assumed that when the recording mark M is irradiated with the reading beam OB for reading the recording mark M, the light intensity distribution of the reflected beam at the recording mark M shows an abrupt change in accordance with the distance from the center of the protrusion M1, as compared to a recording mark M only including a protrusion M1. This makes it possible to read the recording mark M with high degree of modulation.

The present invention is applicable not only for recording information by causing the recording layer 14 to deform to form a protrusion, but also for recording the information by forming a recess portion. For example, the recording layer 14 may be deformed into a recess shape to record the information using a recording beam with an increased level of energy as obtained by increasing the energy of the recording beam, such as by increasing the peak power of the recording beam. Further, the non-reflective interface 18B may deform upon recording the information in the optical information recording medium 10 according to this embodiment; however, since the reflection of the reading beam OB does not occur at the non-reflective interface 18B, this deformation in the non-reflective layer 18B does not affect reading of the information.

To erase the information recorded in the recording layer 14, the recording layer 14 is heated to a temperature as high as the glass transition temperature of the polymer binder, preferably to a temperature higher than the glass transition point, so that the fluidity of the polymer binder is increased and the deformation in the reflective interface 18A disappears due to surface tension to thereby return to its original flat plane. As a result, the information recorded in the recording layer 14 can be erased. Because the information is erasable in this way, re-recording in the recording layer 14 (repeated recording) can be achieved. When the recording layer 14 is heated for that purpose, the recording layer 14 may be irradiated with a continuous-wave laser beam while bringing the laser beam into focus on the recording layer 14. Heating with a continuous-wave laser beam makes it possible to evenly erase the information recorded in a continuous region within the recording layer 14. The continuous-wave laser used may be the laser used for reading out the information, or alternatively, another laser may be used. In both cases, it is preferable that a laser used emits light having a wavelength absorbable by the one-photon absorption dye in the recording layer 14.

Further, when the information is to be erased by heating the recording layer 14, the optical information recording medium 10 may be heated as a whole to a temperature higher than the glass transition temperature of the polymer binder so that the information recorded in all the recording layers 14 can be erased at once. Accordingly, all the information recorded in the optical information recording medium 10 is easily erased for initialization. Further, when the optical information recording medium 10 is to be disposed of, the information can be easily erased irreversibly.

As described above, since the optical information recording medium 10 according to this embodiment includes a one-photon absorption dye as a dye contained in the recording layer 14, information can be recorded using a laser beam having a small peak power. Further, if a semiconductor laser is used to emit a laser beam having a small peak power, the output of the laser beam can be readily adjusted. Furthermore, since the recording layer 14 of the optical information recording medium 10 contains a recording material comprising dye bound to a polymer binder, it is possible to prevent the dye from dispersing into the intermediate layer 15. This can improve the long-term stability of the optical information recording medium 10.

Although one embodiment of the present invention has been described above, the present invention is not limited to the above-described embodiment and various changes and modifications may be made where necessary.

In the above-described embodiment, the optical information recording medium 10 is configured such that when a recording layer 14 is irradiated with the recording beam, a protrusion is formed in only one interface (reflective interface 18A) and a protrusion is not formed in the other interface (non-reflective interface 18B); however, the present invention is not limited to this configuration. Namely, the optical information recording medium according to the present invention may be configured such that a protrusion sticking out into the adjacent intermediate layer is formed on each interface of the recording layer as different information. To be more specific, this configuration can be achieved if all the intermediate layers adjacent to one recording layer are made, for example, of the adhesive agent layer 15A in the above-described embodiment. In this modification, in order to prevent crosstalk across a plurality of recording layers 14, it is preferable that each one of the recording layers has a thickness not less than 2 µm, more preferably not less than 5 µm, and further preferably not less than 7 µm. Although the thickness of the recording layer does not have a determinate upper limit, in order to increase the number of recording layers, it is preferable that the thickness thereof is thinner (e.g., not more than 20 µm) as long as the crosstalk does not occur across the recording layers.

In the above-described embodiment, the optical information recording medium 10 includes the guide layer 11A, the reflective layer 12, the spacer layer 13, the cover layer 16 and the hard coat layer 17 as shown in FIG. 2. However, the present invention is not limited to this configuration, and the presence or absence of any of these layers is optional. Further, in the above-described embodiment, the optical information recording medium 10 is stored in the cartridge 20 as shown in FIG. 1. However, the present invention is not limited to this specific configuration, and the optical information recording medium 10 may not be stored in a cartridge. Further, the optical information recording medium 10 including a plurality of recording layers 14 has been exemplified in the above-described embodiment. However, the is present invention is not limited to this configuration, and the number of the recording layers may be one.

One example of preferred methods for manufacturing the optical information recording medium 10 configured as described above will be described.

Figure 5A:
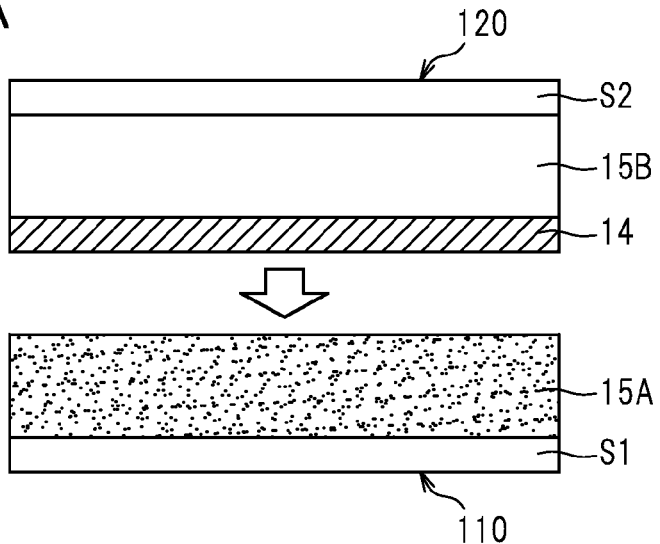
FIGS. 5A to 5C are diagrams explaining an example of the method for manufacturing an optical information recording medium.

As seen in FIG. 5A, a first sheet 110 is produced by forming an adhesive agent layer 15A on a side of a first releasable sheet S1 to which release agent has been applied. To be more specific, the adhesive agent layer 15A can be formed, for example, by applying adhesive agent on the first releasable sheet S1.

A second sheet 120 is produced by forming a recording layer support layer 15B on a side of a second releasable sheet S2 (which is prepared separately from the first releasable sheet S1) to which release agent has been applied and subsequently forming a recording layer 14 on the recording layer support layer 15B. It is to be noted that the release agent having a higher releasability is applied on the second releasable sheet S2 such that a force required for peeling off the second releasable sheet S2 is weaker than a force required for peeling off the first releasable sheet S1.

Herein, a method for producing respective layers on the second sheet 120 will be specifically described. For example, the recording layer support layer 15B can be formed by applying ultraviolet curable resin on the second releasable sheet S2, followed by irradiation with ultraviolet light to cure the ultraviolet curable resin. Meanwhile, the recording layer 14 can be formed by: preparing a coating liquid by dissolving in a solvent a material of the recording layer 14 comprising a recording material in which a one-photon absorption dye is bound to a polymer binder (first step); applying the coating liquid on the surface of the recording layer support layer 15B which is a recording layer 14 forming surface (second step); and carrying out a heating treatment for removing the solvent in the coating liquid (third step).

In the first step, the solvent in which the material of the recording layer 14 is dissolved may include, for example, dichloromethane, chloroform, methyl ethyl ketone (MEK), acetone, methyl isobutyl ketone (MIBK), toluene, hexane, propyleneglycol monomethylether acetate (PGMEA) and cyclohexanone. Further, in the first step, the concentration of the one-photon absorption dye contained in the recording material can be adjusted by adding a polymer binder to the coating liquid, in other words, by dissolving the polymer binder in the solvent together with the recording material. Further, in the third step, it is preferable that the heat treatment is carried out at a temperature higher than the grass transition temperature of the recording layer 14.

The above manufacturing method may not necessarily follow a particular order; the order of forming the first sheet 110 and the second sheet 120 may be determined without limitation. Further, the material of each layer may be applied by any conventional method such as a spin coating method, a knife coating method, a roll coating method, a bar coating method, a blade coating method, a die coating method, and a gravure coating method.

Figure 5B:
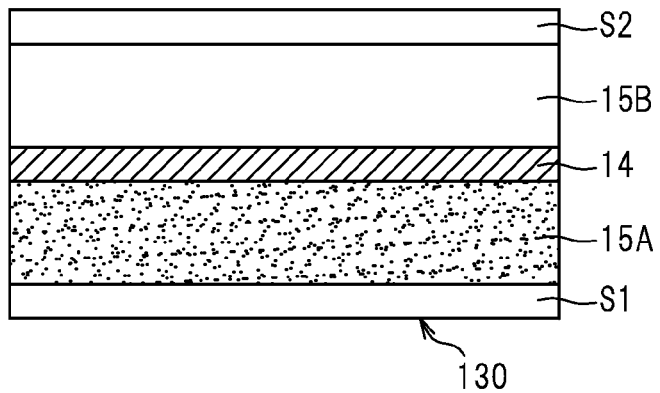
Figure 5C:
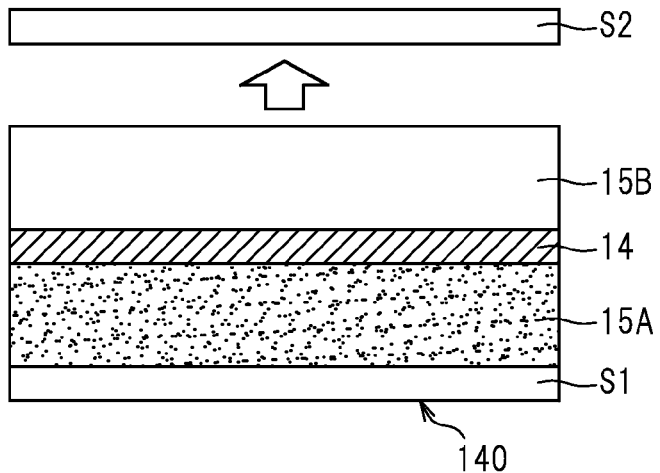

After that, the adhesive agent layer 15A of the first sheet 110 and the recording layer 14 of the second sheet 120 are laminated together so that the second sheet 120 is placed on top of the first sheet 110, whereby a third sheet 130 shown in FIG. 5B is obtained. As seen in FIG. 5C, the second releasable sheet S2 is removed from the third sheet 130 to expose the recording layer support layer 15B. As described above, since the second releasable sheet S2 is more easily releasable from the third sheet 130 than the first releasable sheet S1 is, it is possible to remove the second releasable sheet S2 only, without releasing the first releasable sheet S1.

Figure 6A:
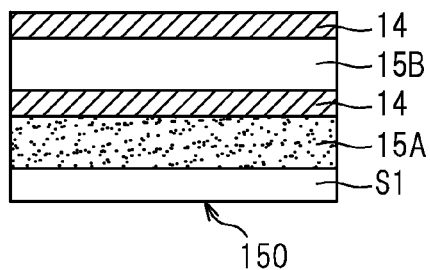
FIGS. 6A to 6F are diagrams explaining an example of the method for manufacturing an optical information recording medium.

Next, as seen in FIG. 6A, the recording layer 14 is formed on the exposed surface of the recording layer support layer 15B by the same method as used for forming the recording layer 14 upon producing the second sheet 120 as described above, to thereby obtain a multi-layered structure sheet 150. However, the recording layer 14 may be formed by another method that is different from the one used for forming the recording layer 14 upon producing the second sheet 120.

The multi-layered structure sheet 150 obtained as described above is rolled up for storage and pulled out, when used, by the required amount.

Next, while a substrate 11 (the asperities formed on the substrate 11, the reflective layer 12 and the spacer layer 13 are not shown in the figure) is prepared, the rolled-up multi-layered structure sheet 150 is wound off and blanked into a shape corresponding to the substrate 11. As seen in FIG. 6B, the first releasable sheet S1 is removed from the blanked multi-layered structure sheet 150 to obtain a multi-layered structure sheet 210 from which the adhesive agent layer 15A is exposed to view.

Figure 6D:
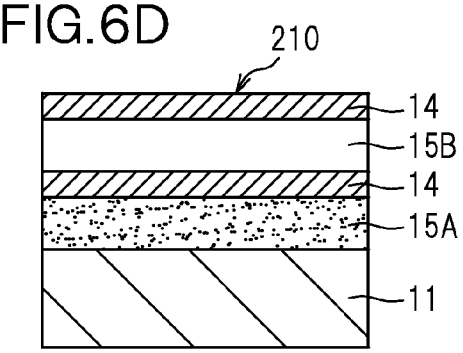
Figure 6B:
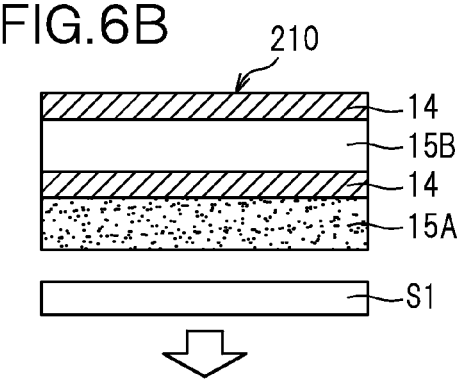
Figure 6E:
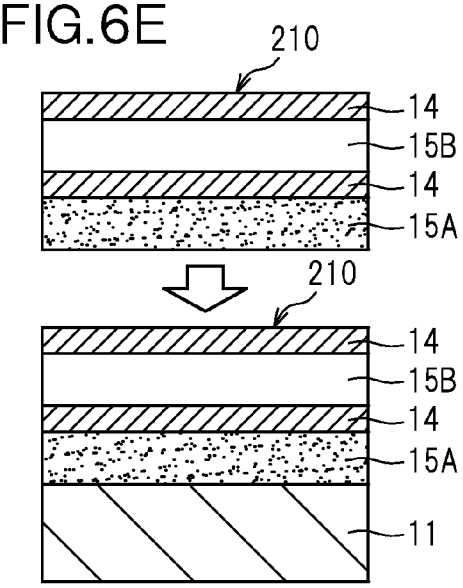
Figure 6C:
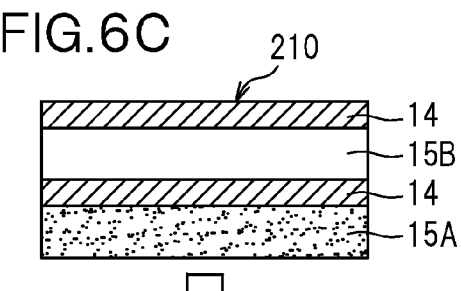

Next, as seen in FIG. 6C, the exposed adhesive agent layer 15A of the multi-layered structure sheet 210 is attached on top of the substrate 11, so that a single unit structure (the adhesive agent layer 15A, the recording layer 14, the recording layer support layer 15B, and the recording layer 14 in this order from bottom to top) is formed on top of the substrate 11 as shown in FIG. 6D.

Figure 6F:
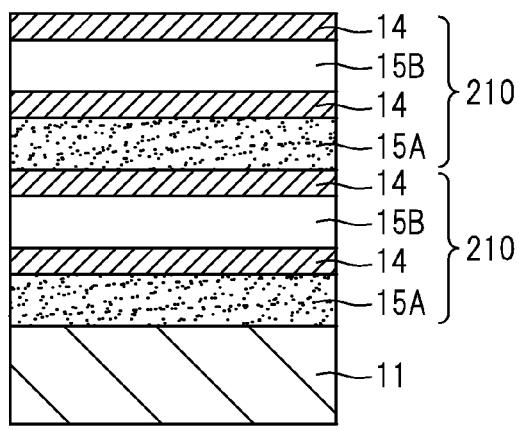

After that, as seen in FIG. 6E, the adhesive agent layer 15A of another multi-layered structure sheet 210 is attached to the recording layer 14 that is disposed at the uppermost layer of the multi-layered structure sheet 210 having been attached to the substrate 11, so that two unit structures are formed on top of the substrate 11 as shown in FIG. 6F. Further, the required number of steps is repeated to superpose further multi-layered structure sheets 210 on top of the uppermost recording layer 14 of the multi-layered structure sheet 210 provided on the substrate 11.

Finally, an adhesive agent layer 15A is formed on top of the uppermost recording layer 14, and a cover layer 16 and a hard coat layer 17 are formed thereon, so that an optical is information recording medium 10 with a multi-layered structure including a plurality of recording layers 14, such as shown in FIG. 2, can be manufactured.

The above-described manufacturing method makes it possible to manufacture an optical information recording medium 10 which enables recording using a laser having a small peak power, while improving the long-term stability. Further, since the material of the recording layer 14 contains a recording material comprising a dye bound to a polymer binder, phase separation resulting from dispersion or aggregation of the dye is less likely to occur as compared to the case where a material comprising a dye dispersed in a polymer binder is used; therefore, the solvent can be removed by the heat treatment upon formation of the recording layer 14. This makes it possible to remove the solvent in a short period of time, so that the productivity of the optical information recording medium 10 can be improved.

Further, even if the recording layer 14 is thickened upon formation of the recording layer 14, it is possible to reduce the absorptance to the recording/reading beam, e.g., by adjusting the concentration of the one-photon absorption dye contained in the recording material by adding the polymer binder to the coating liquid. Therefore, on one hand the thickness of the recording layer 14 is thickened such an extent as to facilitate formation of the recording mark M, but on the other hand multi-layered recording layers 14 can be produced by reducing the absorptance of one recording layer 14. Further, if the heat treatment for formation of the recording layer 14 is carried out at a temperature higher than a glass transition temperature of the recording layer 14, the solvent can be removed in shorter period of time, with the result that the productivity of the optical information recording medium 10 can be further improved.

EXAMPLES

Description will be given of experiments for characterization of the optical information recording medium according to the present invention.

Recording Material

Example 1

In Example 1, a one-photon absorption dye bound to a polymer binder was used as a recording material.

To be more specific, the compound having the above chemical structural formula C-1 was used as the recording material comprising the one-photon absorption dye bound to the polymer binder. The content in mass percentage of the one-photon absorption dye in the recording material was 22 mass %.

The compound having the chemical structural formula C-1 was synthesized by the following method:

[Chem. 2]

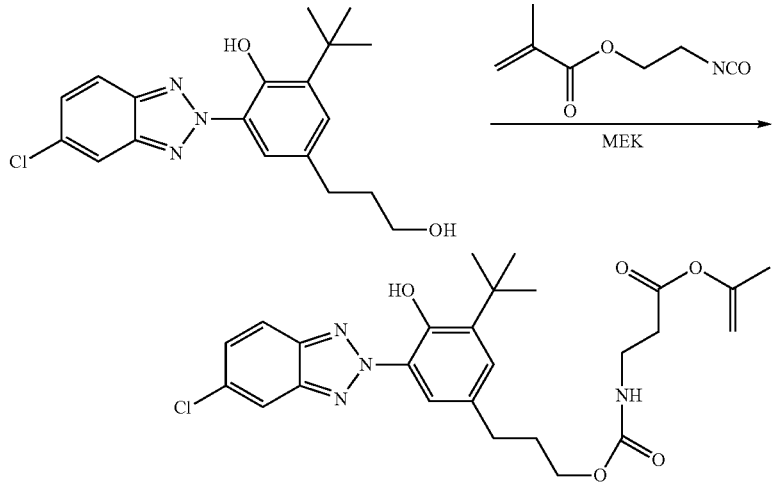

M-1

(1) Synthesis of Raw Material Compound M-1

Tinuvin®109 manufactured by BASF was hydrolyzed and reduced to obtain 0.7 g of 3-[3-tert-butyl-5-(5-chloro-2H-benzotriazol-2-yl)-4-hydroxyphenyl]propanol, which was then dissolved in 5 ml of methyl ethyl ketone, together with 0.31 g of Karenz MOI® manufactured by Showa Denko K.K. After that, 0.02 g of dibutyltin laurate and 0.02 g of p-methoxyphenol were added thereto and reacted at 75° C. for four hours, followed by distillation of the solvent to obtain 1.0 g of Compound M-1.

(2) Synthesis of C-1

3.4 ml of propylene glycol monomethylether acetate was stirred while being heated under nitrogen atmosphere at 90° C. 3.4 ml solution of propylene glycol monomethylether acetate to which 1.0 g of Compound M-1, 3.5 g of benzyl methacrylate, and 0.14 g of V-601 (manufactured by Wako Pure Chemical Industries, Ltd.) had been added was added dropwise to the 3.4 ml of propylene glycol monomethylether acetate for 2 hours. After that, 0.14 g of V-601 was added and then stirred for 4 hours while being heated at 90° C., followed by allowing it to cool, to thereby obtain 11 g of a propylene glycol monomethylether acetate solution containing 40 mass % of the compound having the chemical structural formula C-1.

Comparative Example 1

In Comparative Example 1, a one-photon absorption dye dispersed in a polymer binder was used as a recording material.

To be more specific, polybenzylmethacrylate was used as the polymer binder, and the compound P-1 (3-[3-tert-butyl-5-(5-chloro-2H-benzotriazol-2-yl)-4-hydroxyphenyl]propanol) as shown below was used as the one-photon absorption dye.

[Chem. 3]

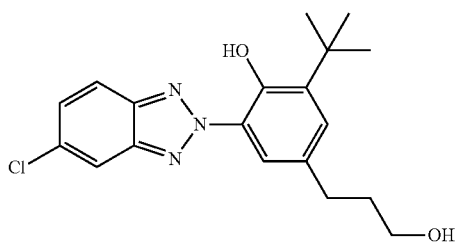

P-1

Tinuvin®109 manufactured by BASF was hydrolyzed and reduced to obtain the compound P-1.

Comparative Example 2

In Comparative Example 2, two-photon absorption dye bound to a polymer binder was used as a recording material.

To be more specific, the compound D-1 as shown below was used as a recording material comprising a two-photon absorption dye bound to a polymer binder. The content in mass percentage of the two-photon absorption dye in the recording material was 40 mass %.

[Chem. 4]

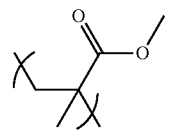
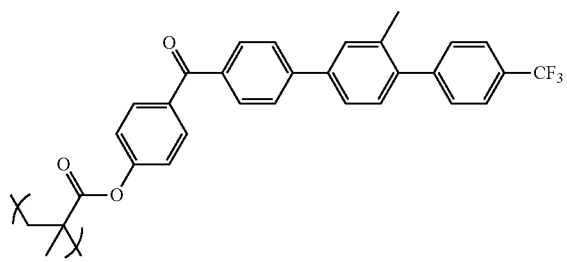

D-1

The compound D-1 was synthesized by the following method:

[Chem 5]

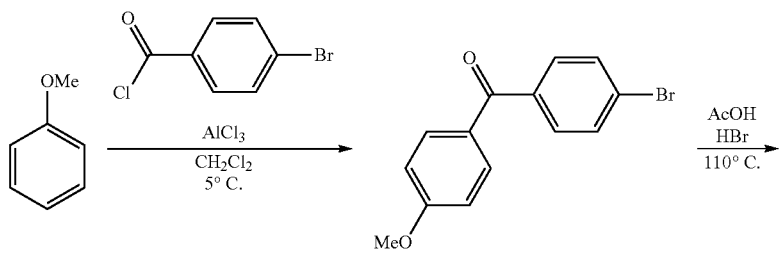

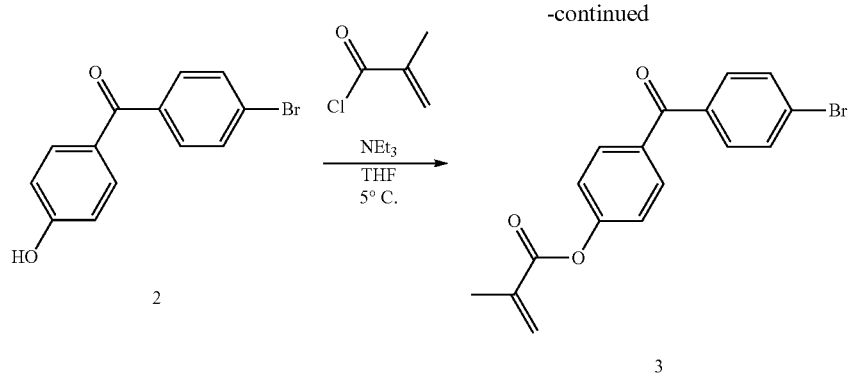
-continued
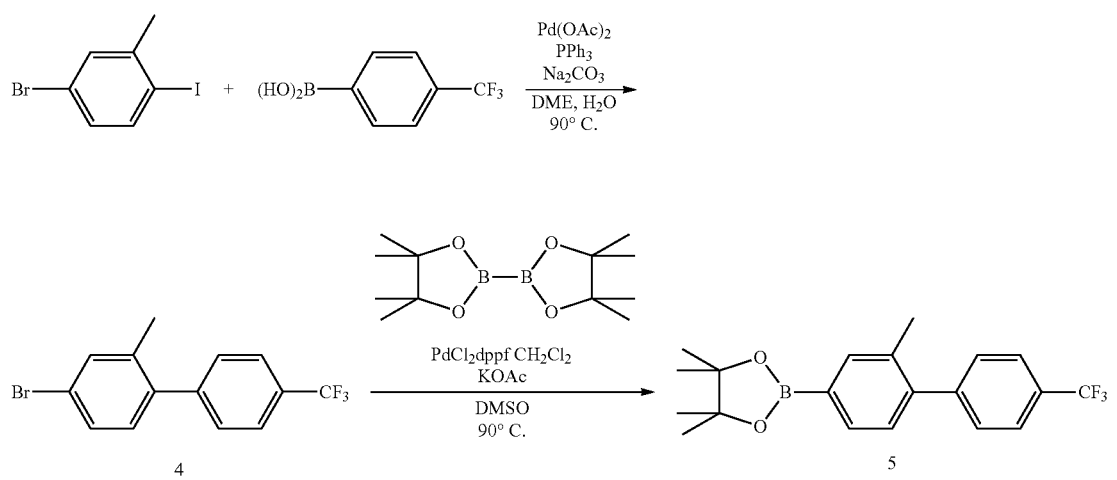
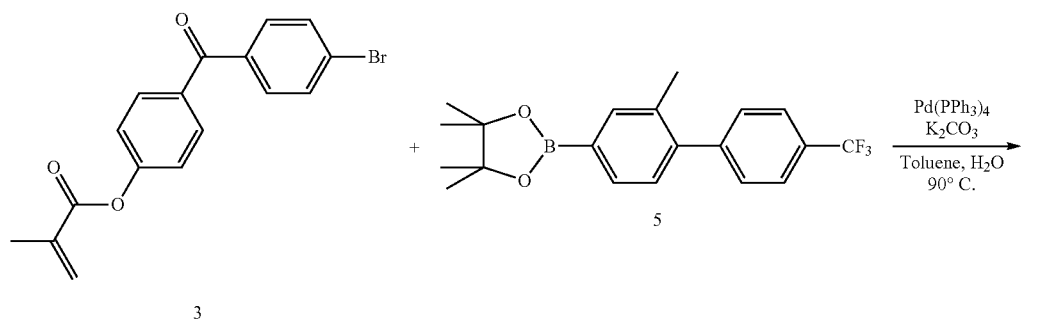
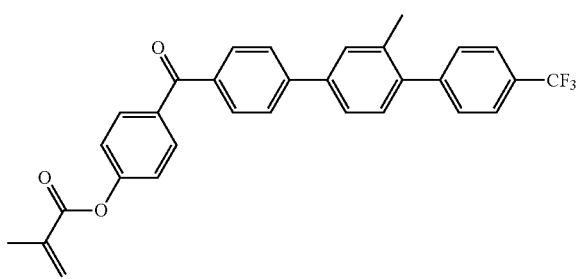

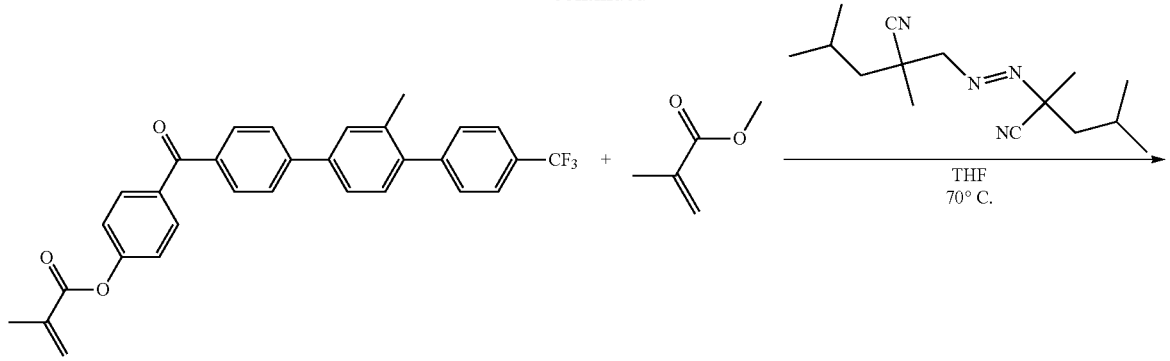

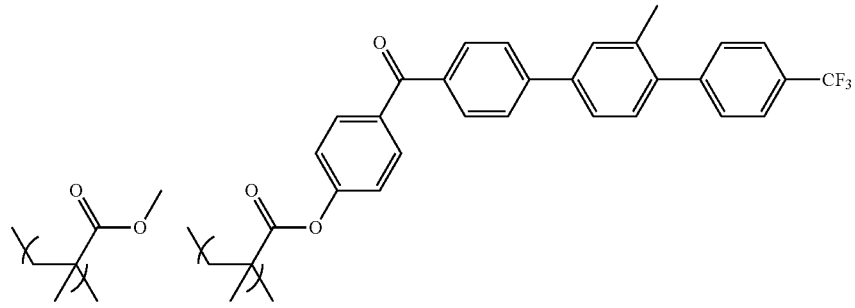

D-1

(1) Synthesis of Raw Material Compound 1

27.0 g (250 mmol) of anisole and 42.9 g (200 mmol) of 4-bromobenzoyl chloride were dissolved in 500 ml of methylene chloride and cooled to an inner temperature of 5° C., and thereafter, 33.4 g (250 mmol) of aluminum chloride was divided into six batches and added thereto, and stirred for 8 hours under nitrogen atmosphere. The reaction solution was poured into water, followed by extraction with methylene chloride and evaporation to dryness using a rotary evaporator, to thereby obtain white-colored compound 1 in a quantitative manner. It was verified by $^1$H NMR that the obtained compound 1 was the target product.

(2) Synthesis of Raw Material Compound 2

140 ml of hydrobromic acid and 220 ml of acetic acid were added to 35.0 g (120 mmol) of Raw material compound 1, and the mixture was stirred for 12.5 hours at an inner temperature of 110° C. After allowing the reaction solution to cool to room temperature, the reaction solution was poured into water and stirred for 20 minutes at room temperature. The precipitate was filtered, and then washed with pure water and hexane:ethyl acdetate=5:1 and dried under reduced pressure to obtain white-colored compound 2 in a quantitative manner. It was verified by $^1$H NMR that the obtained compound 2 was the target product.

(3) Synthesis of Raw Material Compound 3

9.74 g (35.1 mmol) of Raw material compound 2 was dissolved in 70 ml of tetrahydrofuran, and 7.10 g (70.2 mmol) of triethylamine was added thereto. The mixture was cooled to an inner temperature of 5° C. and then stirred for 2 hours under nitrogen atmosphere while adding thereto dropwise 3.67 g (35.1 mmol) of methacrylic acid chloride. The reaction solution was poured into water and stirred for 20 minutes at room temperature. The deposited precipitate was separated out, followed by dryness at room temperature, to thereby obtain white-colored compound 3 in a quantitative manner. It was verified by $^1$H NMR that the obtained compound 3 was the target product.

(4) Synthesis of Raw Material Compound 4

350 ml of 1,2-dimethoxyethane and 70 ml of water were added to 63.5 g (214 mmol) of 5-bromo-2-iodotoluene, 44.7 g (235 mmol) of para-trifluoromethylphenyl boronic acid, 2.40 g (10.7 mmol) of palladium diacetate, and 68.0 g (642 mmol) of sodium carbonate, and the mixture was stirred for 72 hours under nitrogen atmosphere at an outer temperature of 90° C. The reaction solution was allowed to cool to room temperature, followed by extraction with ethyl acetate and concentration using a rotary evaporator, and then purified on a silica gel column (hexane) to obtain 57.9 g (yield: 86%) of white-colored compound 4. The obtained compound 4 was verified as the target product with $^1$H NMR.

(5) Synthesis of Raw Material Compound 5

400 ml of dimethylsulfoxide was added to 57.9 g (184 mmol) of Raw material compound 4, 56.1 g (221 mmol) of bispinacolatodiboron, 4.25 g (5.20 mmol) of [1,1'-bis(diphenylphosphino)ferrocene]palladium(II) dichloride dichloromethane adduct, and 54.2 g (552 mmol) of potassium acetate, and the mixture was stirred for 5 hours under nitrogen atmosphere at an inner temperature of 90° C. The reaction solution was allowed to cool to room temperature, followed by extraction with ethyl acetate and concentration using a rotary evaporator, and then purified on a silica gel column (hexane:ethyl acetate=10:1) to obtain 57.5 g (yield: 86%) of white-colored compound 5. It was verified by $^1$H NMR that is the obtained compound 5 was the target product.

(6) Synthesis of Raw Material Compound 6

170 ml of toluene and 20 ml of water were added to 14.8 g (42.9 mmol) of Raw material compound 3, 18.6 g (51.5 mmol) of Raw material compound 5, and 2.48 g (2.15 mmol) of tetrakistriphenylphosphine palladium, 17.8 g (129 mmol)

of potassium carbonate, and 1 mg of dibutylhydroxytoluene, and the mixture was stirred for 12 hours under nitrogen atmosphere at an outer temperature of 90° C. The reaction solution was allowed to cool to room temperature, followed by extraction with ethyl acetate and concentration using a rotary evaporator, and then purified on a silica gel column (ethyl acetate:hexane=1:5), recrystallized from ethyl acetate/hexane, separated out by filtration, and dried to obtain 6.8 g (yield: 32%) of white-colored compound 6. It was verified by $^1$H NMR that the obtained compound 6 was the target product. $^1$H NMR (CDCl3) 7.92 (d, 4H), 7.76 (dd, 2H), 7.71 (d, 2H), 7.59-7.55 (m, 2H), 7.50 (d, 2H), 7.34 (d, 1H), 7.29 (dd, 2H), 6.41 (s, 1H), 5.82 (t, 1H), 2.37 (s, 3H)

(7) Synthesis of D-1

5 g of tetrahydrofuran was stirred under nitrogen atmosphere at an outer temperature of 70° C., and then 2.00 g (4.00 mmol) of Raw material compound 6 dissolved in 26.7 g of tetrahydrofuran, 11.6 g (116 mmol) of methyl methacrylate, and 29.8 mg (0.12 mmol) of 2,2'-azobis(2,4-dimethylvaleronitrile) were added dropwise thereto for 2 hours, followed by stirring for 8 hours. After the reaction solution was allowed to cool to room temperature, the reaction solution was diluted with acetone, recrystallized from acetone/hexane, separated by filtration and dried to obtain 4.77 g of Compound D-1. The composition of the obtained polymer was checked with $^1$H NMR, and the molecular weight of the obtained polymer was measured by GPC (compositional ratio: Raw material compound 6/methyl methacrylate=12/88 (by mol), Mw: 367,000).

Production of Optical Information Recording Medium

Example 1

(1) Formation of Intermediate Layer (Recording Layer Support Layer)

Ultraviolet curable resin (SD-640 manufactured by DIC Corporation, Tg=86° C.) was applied to a glass substrate (diameter: 120 mm, thickness: 1 mm) by spin coating to make a layer of 20 μm thickness. The ultraviolet curable resin was cured by irradiation with ultraviolet light to thereby form an intermediate layer (recording layer support layer).

(2) Formation of Recording Layer

A recording material having the above-described chemical structural formula C-1 was dissolved in propyleneglycol monomethylether acetate such that the solid content concentration thereof was adjusted to 13 mass %, to thereby prepare a coating liquid. After that, the coating liquid was applied onto the intermediate layer (recording layer support layer) by spin coating to form a recording layer having a thickness of 1 μm.

(3) Formation of Intermediate Layer (Adhesive Agent Layer)

As a Releasable Sheet, a Polyethylene Terephthalate Film was Prepared; the Surface of the polyethylene terephthalate film had been coated with a silicone releasable layer. An acrylic ester-based adhesive was coated on the polyethylene terephthalate film by bar-coating method so that an adhesive agent layer having a thickness of 20 μm was formed. Thereafter, the adhesive agent layer was laminated on the recording layer. An intermediate layer (adhesive agent layer) was formed by removing the releasable sheet.

(4) Formation of Cover Layer

A polycarbonate film (Panlite® film D-67 manufactured by TEIJIN CHEMICALS LTD.) having a thickness of 67 μm was laminated on and adhered to the intermediate layer (adhesive agent layer) to form a cover layer.

Comparative Example 1

(1) Formation of Intermediate Layer (Recording Layer Support Layer)

An intermediate layer (recording layer support layer) was formed by the same method as disclosed in the above Example 1.

(2) Formation of Recording Layer

The above-described compound P-1 (one-photon absorption dye) and polybenzylmethacrylate (manufactured by Sigma-Aldrich Co. LLC., Mw: 70000) were dissolved in methyl ethyl ketone with the mass ratio of 22:78, so that a coating liquid with a solid content concentration of 10 mass % was prepared. After that, the coating liquid was applied onto the intermediate layer (recording layer support layer) by spin coating to form a recording layer having a thickness of 1 μm.

(3) Formation of Intermediate Layer (Adhesive Agent Layer)

An intermediate layer (recording layer support layer) was formed by the same method as disclosed in the above Example 1.

(4) Formation of Cover Layer

A cover layer was formed by the same method as disclosed in the above Example 1.

Comparative Example 2

(1) Formation of Intermediate Layer (Recording Layer Support Layer)

An intermediate layer (recording layer support layer) was formed by the same method as disclosed in the above Example 1.

(2) Formation of Recording Layer

The above compound D-1 was dissolved in methyl ethyl ketone such that the solid content concentration thereof was adjusted to 10 mass %, to thereby prepare a coating liquid. After that, the coating liquid was applied onto the intermediate layer (recording layer support layer) by spin coating to form a recording layer having a thickness of 1 μm.

(3) Formation of Intermediate Layer (Adhesive Agent Layer)

An intermediate layer (recording layer support layer) was formed by the same method is as disclosed in the above Example 1.

(4) Formation of Cover Layer

A cover layer was formed by the same method as disclosed in the above Example 1.

<Evaluation of Characteristics>

(1) Evaluation on Absorptance of Recording Layer

The coating liquid, which was prepared in the process of the formation of the recording layer as described above and in which the recording material was dissolved in the solvent, was applied onto a quartz glass by spin coating to make a layer of 1 µm thickness. By this method, a sample in which a recording layer only was formed was prepared for Example 1 and Comparative Examples 1 and 2. Thereafter, the absorbance of each sample (recording layer) at the wavelength of 405 nm was measured using a spectrophotometer (UV3100-PC manufactured by Shimadzu Corporation). Baseline was corrected by the measurement value of the quartz glass alone.

The light absorptance (%) was calculated from the obtained absorbance by the following formula.

$$\text{Light absorptance} = (1 - 10^{-(Absorbance)}) \times 100$$

As a result, the light absorptance of 8% was obtained in Example 1 and Comparative Example 1, and the light absorptance of 0% was obtained in Comparative Example 2.

(2) Evaluation on Recording Property

[Recording/Reading Evaluation Apparatus]

Recording and reading of the optical information recording media in Example 1 and Comparative Examples 1 and 2 were performed using a system equivalent to an ordinal Blu-ray (BD) Disc pick-up optical system, and ODU-1000 (manufactured by Pulstec Industrial Co., Ltd.) was used as a control unit of an evaluation system comprising a spindle motor, a recording/reading laser, a light-sensitive element, and other parts. A semiconductor laser with a wavelength of 405 nm was used as a laser light source, and an objective lens with a numerical aperture (NA) of 0.85 was used as an objective lens, and the reflected beam from the recording layer was monitored to obtain a readout signal. Part of the reflected beam was introduced into the focus control light-sensitive element, and the position of the objective lens was controlled to perform a focus control.

Using the above recording/reading evaluation apparatus, the optical information recording media in Example 1 and Comparative Examples 1 and 2 were subject to recording by the following recording conditions, and thereafter the readout signals were obtained by the following reading conditions to evaluate CNR (Carrier to Noise Ratio).

| Recording conditions | |
| --- | --- |
| Linear velocity | 2 m/s |
| Peak power of recording beam | 30 mW |
| Duration time of pulsed laser beam | 30 ns |
| Emission cycle of pulsed laser beam | 1 MHz |
| Read-out conditions | |
| Linear velocity | 2 m/s |
| Peak power of reading beam | 1 mW |

As a result, in Example 1 and Comparative Example 1 in which the one-photon absorption dye was contained as a dye, CNR not smaller than 35 dB was obtained which showed that both of the recording sensitivity and the intensity of the readout signal were sufficient. This revealed that information was recordable by the recording beam having a peak power as small as 30 mW. On the other hand, in Comparative Example 2 in which two-photon absorption dye was contained as a dye, CNR was 0 db. This revealed that information was not recorded by the recording beam having a peak power of 30 mW.

As described above, it was revealed that the optical information recording medium is according to the present invention (Example 1) was recordable by a laser beam having a small peak power.

(3) Evaluation of Storage Property

With respect to each of the optical information recording media according to Example 1 and Comparative Example 1, the intensity of the reflected beam from the interface between the recording layer and the intermediate layer (adhesive agent layer) was measured. Thereafter, these optical information recording media were stored under conditions of 80° C. and 85% RH for 100 hours, and the intensity of the reflected beam from the interface between the recording layer and the intermediate layer (adhesive agent layer) was measured. The measurement of the reflected beam intensity was made using a multilayer film thickness measuring device SI-TS10 (manufactured by Keyence Corporation).

The results showed that in Example 1, the intensity of the reflected beam after 100-hour storage was as high as 90% of the intensity of the reflected beam before storage and a change in the intensity of the reflected beam was small. This means that even if the optical information recording medium which includes a recording material comprising a dye bound to a polymer binder is stored under conditions of high temperature and high humidity, the dye in the recording layer hardly spreads into the intermediate layer, so that excellent storage stability can be obtained. On the other hand, the results showed that in Comparative Example 1, the intensity of the reflected beam after 100-hour storage decreased to 65% of the intensity of the reflected beam before storage and a change in the intensity of the reflected beam was great. This means that if the optical information recording medium which includes a recording material comprising a dye dispersed in a polymer binder is stored under conditions of high temperature and high humidity, the dye in the recording layer easily spreads into the intermediate layer, so that the readout signal degrades significantly due to a significant decrease in the intensity of the reflected beam at the interface.

As described above, it was revealed that the optical information recording medium according to the present invention (Example 1) was excellent in long-term stability.

(4) Evaluation of Recording Mark Shape

The intermediate layer (adhesive agent layer) was peeled off from the optical information recording medium according to Example 1, in which information had been recorded, so that the surface of the recording layer was exposed to view. The surface of the recording layer was observed using the following atomic force microscope (AFM).

[Atomic Force Microscopy]

| | |
| --- | --- |
| Device | Nano Search Microscope OLS-3500 (manufactured by Olympus Corporation) |
| Observation conditions | Dynamic mode, Scanning range of 5 µm, Scanning speed of 1 Hz |
| Probe | High-aspect-ratio probe AR5-NCHR-20 (manufactured by NanoWorld AG) |

As a result, protrusive shapes (protrusions) formed on the recording points and protruding toward the adhesive agent layer were observed at the surface of the recording layer.

Next, the experiment demonstrating advantageous effects of the method for manufacturing the optical information recording medium according to the present invention will be described.

<Recording Material>

In this experiment, a one-photon absorption dye bound to a polymer binder was used as a recording material.

To be more specific, the compound having the following chemical structural formula A (hereinafter referred to as "Compound A") was used as a recording material in which a one-photon absorption dye was bound to a polymer binder. The ratio in mass of the one-photon absorption dye to the recording material was 50 mass %.

[Chem. 6]

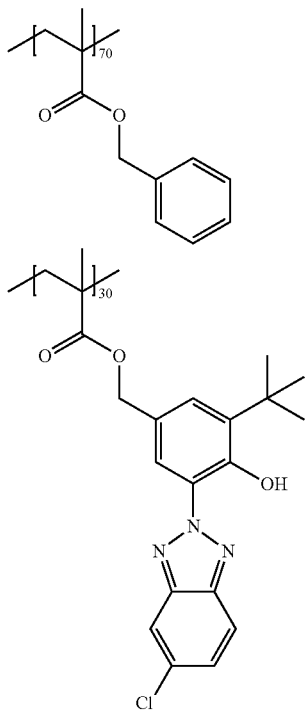

A

Compound A was synthesized by the following method:
[Synthesis of Monomer (1)]

The synthesis of monomer (1) was carried out according to the following scheme.

[Chem. 7]

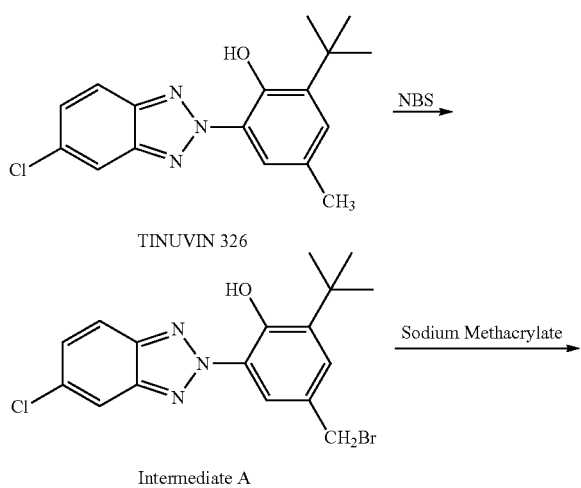

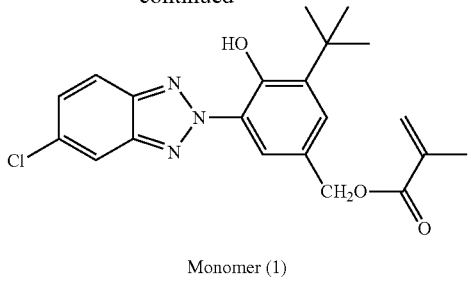

Monomer (1)

32 g of Tinuvin®326 (manufactured by BASF) and 20 g of N-bromosuccinimide were dissolved in 200 ml of chloroform, and then 0.14 g of V-601 (manufactured by Wako Pure Chemical Industries, Ltd.) was added thereto, followed by heating under reflux for 6 hours. After letting the reaction solution cool, 300 ml of acetonitrile was added thereto while cooling in an ice bath, and the produced crystals were filtrated. As a result, 36 g of Intermediate A was obtained.

8.0 g of Intermediate A and 3.2 g of sodium methacrylate were stirred in 80 ml of acetone for 8 hours. The reaction solution was extracted with chloroform and washed with water, and the solid obtained by distilling away the solvent was re-crystallized with acetonitrile. As a result, 6.3 g of Monomer (1) was obtained.

[Synthesis of Compound A]

3.1 ml of propylene glycol monomethylether acetate was stirred while being heated under nitrogen atmosphere at 90° C. 6.5 ml solution of propylene glycol monomethylether acetate to which 2.0 g of Monomer (1), 2.0 g of benzyl methacrylate, and 0.11 g of V601 (manufactured by Wako Pure Chemical Industries, Ltd.) had been added was added dropwise to the 3.1 ml of propylene glycol monomethylether acetate for 2 hours. After that, 0.11 g of V601 was added and then stirred for 4 hours while being heated at 90° C., followed by allowing it to cool, to thereby obtain a propylene glycol monomethylether acetate solution containing 30 mass % of Compound A.

<Preparation of Recording Layer Coating Liquid>
[Coating Liquid 1]

The above-described Compound A was diluted with propyleneglycol monomethylether acetate, so that Coating liquid 1 having solid content concentration of 13 mass % was prepared.

[Coating Liquid 2]

The above-described Compound A and polybenzylmethacrylate (manufactured by Sigma-Aldrich Co. LLC., Mw: 70000) were dissolved in propyleneglycol monomethylether acetate with the mass ratio of 80:20, so that Coating liquid 2 with a solid content concentration of 9 mass % was prepared.

Coating liquid 2 corresponds to a coating liquid in which the concentration of the one-photon absorption dye contained in the recording material has been adjusted by adding the polymer binder. On the other hand, Coating liquid 1 corresponds to a coating liquid in which the concentration of the one-photon absorption dye contained in the recording material has not been adjusted.

<Measurement of Absorptance of Recording Layer>

Coating liquid 1 was applied onto a quartz glass by spin coating to make a layer of 1 μm thickness. Coating liquid 2 was applied onto a quartz glass by spin coating to make a layer of 1 μm thickness. Accordingly, a sample in which a recording layer only was formed was prepared for Coating liquid 1 and Coating liquid 2. Thereafter, the light absorptance was calculated for Coating liquid 1 and Coating liquid 2 by the same method as described previously in Evaluation on absorptance of recording layer.

As a result, the light absorptance of the recording layer formed from Coating liquid 1 was 8%, whereas the light absorptance of the recording layer formed from Coating liquid 2 was 6.4%.

As described above, it was revealed that if the concentration of the one-photon absorption dye contained in the recording material was adjusted by adding the polymer binder is to provide the recording layer having the same thickness, the light absorptance could be lowered, that is, the absorptance could be suppressed.

<Evaluation on Heat Resistance of Recording Layer>

Coating liquid 1 was applied onto a quartz glass by spin coating to make a layer of 1 µm thickness, so that a sample in which a recording layer only was formed was prepared.

Thereafter, a part of the recording layer formed on the quartz glass was scraped off, and the removed recording layer was measured by DSC (Differential Scanning calorimetry) method. As the result of measurement, the glass transition temperature of the recording layer was 62° C.

Further, the above-described sample in which the recording layer was formed on the quartz glass was left at 100° C. for 1 hour, and the recording layer was observed by visual inspection and by an optical microscope. The results revealed that whitening of the recording layer due to phase separation of the dye and the like was not observed.

As described above, it was revealed that a heat treatment could be applied to the optical information recording medium (recording layer) according to the present invention, at a temperature higher than the glass transition temperature. Therefore, according to the present invention, the productivity of the optical information recording medium can be improved because the solvent is removable in a short time.

What is claimed is:

1. An optical information recording medium comprising:
   at least one recording layer; and
   at least one intermediate layer adjacent to the recording layer,
   wherein the recording layer includes a recording material comprising a one-photon absorption dye bound to a polymer compound.

2. The optical information recording medium according to claim 1, further comprising a plurality of recording layers, wherein the intermediate layer is provided between two adjacent recording layers.

3. The optical information recording medium according to claim 2, wherein each recording layer has a first interface and a second interface between the recording layer and two intermediate layers sandwiching the recording layer, and
   wherein after a recording layer is irradiated with a recording beam, the recording layer has a recording mark which consists of a protrusion sticking out into the intermediate layer and which is formed in at least one of the first interface and the second interface.

4. The optical information recording medium according to claim 3, wherein the content in mass percentage of the one-photon absorption dye in the recording material is less than 50%.

5. The optical information recording medium according to claim 3, wherein the thickness of the recording layer is equal to or greater than 50 nm.

6. The optical information recording medium according to claim 4, wherein the thickness of the recording layer is equal to or greater than 50 nm.

7. The optical information recording medium according to claim 3, wherein the intermediate layer forming the interface in which the protrusion is formed is softer than the recording layer.

8. The optical information recording medium according to claim 3, wherein the glass transition temperature of the intermediate layer forming the interface in which the protrusion is formed is lower than the glass transition temperature of the recording layer.

9. The optical information recording medium according to claim 3, wherein the intermediate layer forming the interface in which the protrusion is formed is an adhesive agent layer.

10. The optical information recording medium according to claim 3, wherein the protrusion is formed in one of the first interface and the second interface by irradiation with the recording beam, and the protrusion is not formed in the other one of the second interface and the first interface, and
    wherein the difference between refractive indices of the intermediate layer and the recording layer is greater at the interface in which the protrusions is formed than at the interface in which the protrusion is not formed.

11. The optical information recording medium according to claim 10, wherein the refractive index of the intermediate layer at the interface in which the protrusion is not formed is equal to the refractive index of the recording layer.

12. The optical information recording medium according to claim 3, wherein the protrusion sticks out in the range of 1-300 nm with reference to the interface before undergoing a change in shape.

13. The optical information recording medium according to claim 3, wherein the thickness of the intermediate layer is in the range of 2-20 µm.

14. The optical information recording medium according to claim 1, further comprising a cover layer for protecting the recording layer.

15. The optical information recording medium according to claim 14, wherein the thickness of the cover layer is in the range of 0.01-0.2 mm.

16. A method for manufacturing an optical information recording medium comprising a recording layer and an intermediate layer adjacent to the recording layer, the method comprising:
    a first step of preparing a coating liquid by dissolving a recording material comprising a one-photon absorption dye bound to a polymer compound in a solvent;
    a second step of applying the coating liquid on a recording layer-forming surface; and
    a third step of carrying out a heat treatment for removing the solvent.

17. The method for manufacturing an optical information recording medium according to claim 16, wherein the first step comprises adjusting the concentration of the one-photon absorption dye contained in the recording material by adding the polymer compound.

18. The method according to claim 16, wherein in the third step, the heat treatment is carried out at a temperature higher than the glass transition temperature of the recording layer.

19. The optical information recording medium according to claim 1, wherein the one-photon absorption dye is covalently bonded to the polymer compound.

* * * * *